United States Patent [19]

Nottingham et al.

[11] Patent Number: 5,332,289
[45] Date of Patent: Jul. 26, 1994

[54] READY-TO-ASSEMBLE FURNITURE WITH IMPROVED FASTENING MEANS

[75] Inventors: John R. Nottingham; John W. Spirk, both of Moreland Hills; Jeffrey M. Kalman, Cleveland Heights; Robert G. Taylor, Strongsville; Roland A. Stenta, Shaker Heights; Emily P. Stenta, Cincinnati, all of Ohio

[73] Assignee: Galsten Trading, Inc., Cleveland, Ohio

[21] Appl. No.: 794,410

[22] Filed: Nov. 19, 1991

Related U.S. Application Data

[63] Continuation-in-part of Ser. No. 531,878, May 31, 1990, Pat. No. 5,088,180.

[51] Int. Cl.$^5$ .............................................. A47C 7/00
[52] U.S. Cl. ............................ 297/440.1; 297/440.15; 52/585.1; 108/153; 248/165
[58] Field of Search ............ 29/897.3, 897.31, 897.312, 29/525, 525.1, 469; 52/582, 585; 297/440, 443; 108/111, 153, 157; 248/165

[56] References Cited

U.S. PATENT DOCUMENTS

| | | | |
|---|---|---|---|
| 1,537,459 | 5/1925 | Campbell | 108/153 X |
| 2,669,295 | 2/1954 | Shepherdson | 248/165 X |
| 2,705,995 | 4/1955 | McMurtry . | |
| 3,741,594 | 6/1973 | Ostling . | |
| 3,894,377 | 7/1975 | Welch . | |
| 3,996,718 | 12/1976 | Welch . | |
| 4,163,537 | 8/1979 | Mourgue | 108/153 X |
| 4,178,047 | 12/1979 | Welch . | |
| 4,201,417 | 5/1980 | Griffith . | |
| 4,209,198 | 6/1980 | Apple, Sr. . | |
| 4,254,596 | 3/1981 | Wright et al. . | |
| 4,332,205 | 6/1982 | Corl, Jr. . | |
| 4,430,947 | 2/1984 | Kuame | 108/111 |
| 4,470,716 | 9/1984 | Welch . | |
| 4,473,316 | 9/1984 | Welch . | |
| 4,474,493 | 10/1984 | Welch . | |
| 4,577,906 | 3/1986 | Hsiung . | |
| 4,691,965 | 9/1987 | Hsiung . | |
| 4,796,541 | 1/1989 | Halstrick | 108/111 |
| 5,174,200 | 12/1992 | Jeandel et al. | 108/111 |

FOREIGN PATENT DOCUMENTS

| | | | |
|---|---|---|---|
| 741759 | 12/1955 | United Kingdom | 248/165 |
| 886859 | 1/1962 | United Kingdom | 108/153 |

OTHER PUBLICATIONS

Mod-Eez Fastener Price List of Modular Systems, Inc. (May 1, 1989).
The Pine Creek Collection 5915 Assembly Instructions; Sauder Woodworking (undated).
Mod-Eez Flexible Joint Structural Fastening System of Modular Systems, Inc. Brochure.

*Primary Examiner*—Timothy V. Eley
*Attorney, Agent, or Firm*—Connolly and Hutz

[57] ABSTRACT

A multi-part article of furniture, such as a chair or table, capable of being assembled without tools or glue is disclosed. The legs of the table or chair can be rigidly, but removably, attached to the table top or chair seat by slideably engaging an elongated dowel protruding from an upper side surface of the leg into a mating slot formed in the end wall of an apron attached to the underside of the table top or chair seat. Alternatively, the elongated dowel may protrude from the apron and the upper side surface of the leg may contain a mating slot. Fastening clips may provide additional attachment between the legs and aprons and a separate dowel protruding from the upper end surface of the leg may mate with a bore in the underside of the seat or table top. In one embodiment, the length of the legs is varied either by replacement with longer-length legs or by the addition of leg-extension members.

10 Claims, 7 Drawing Sheets

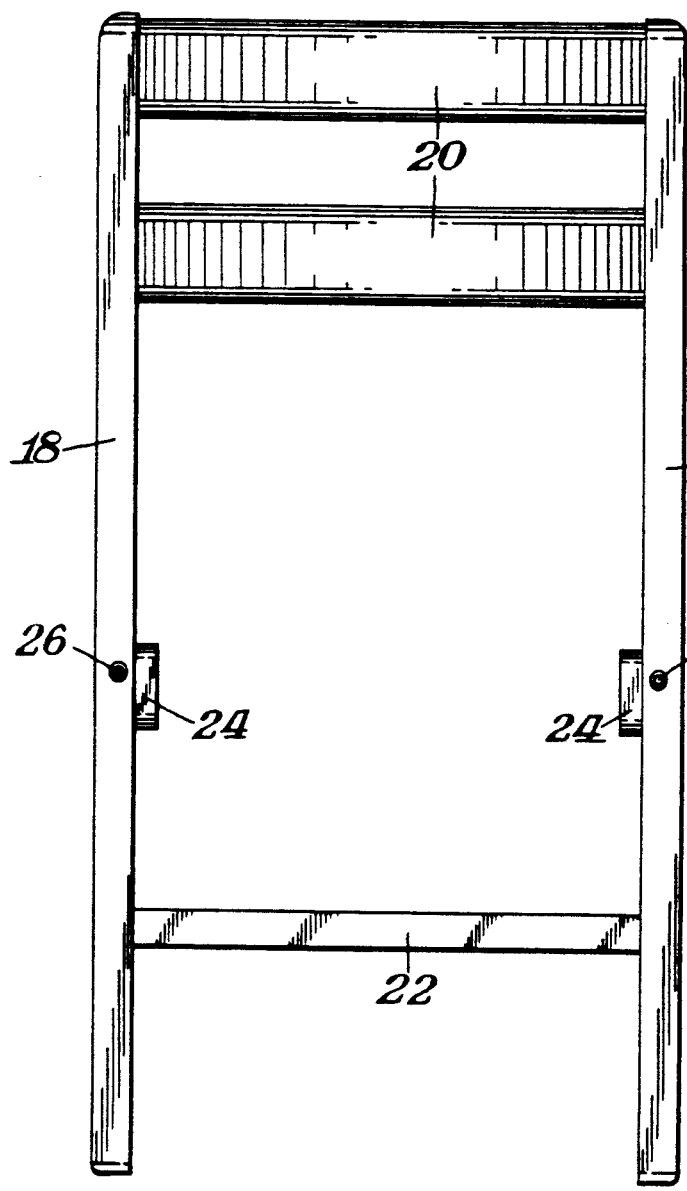
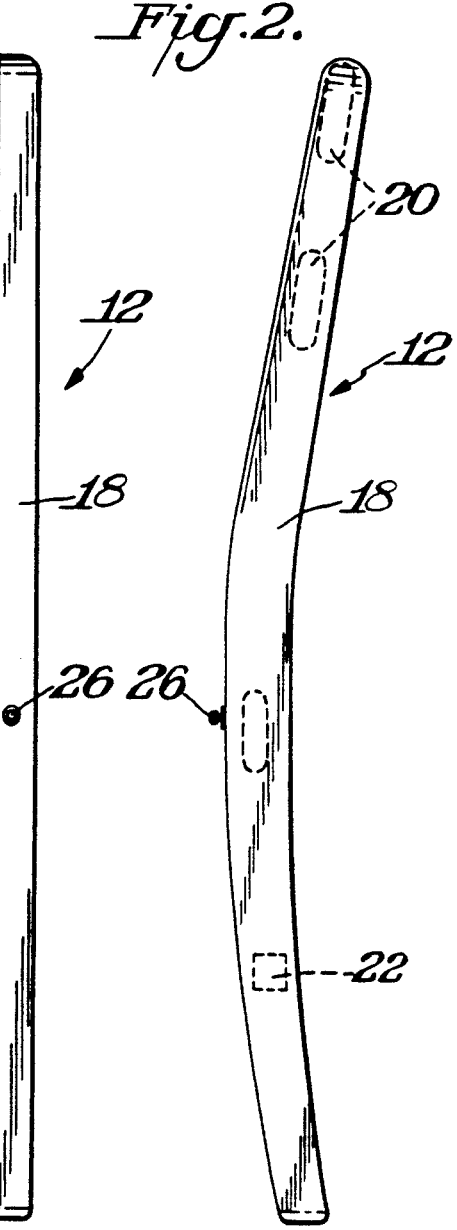

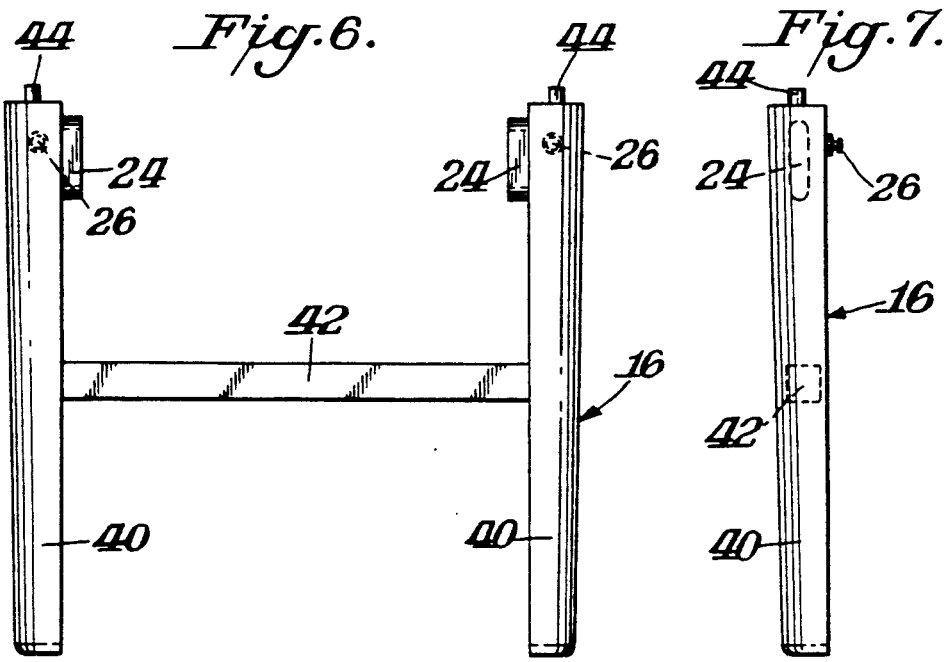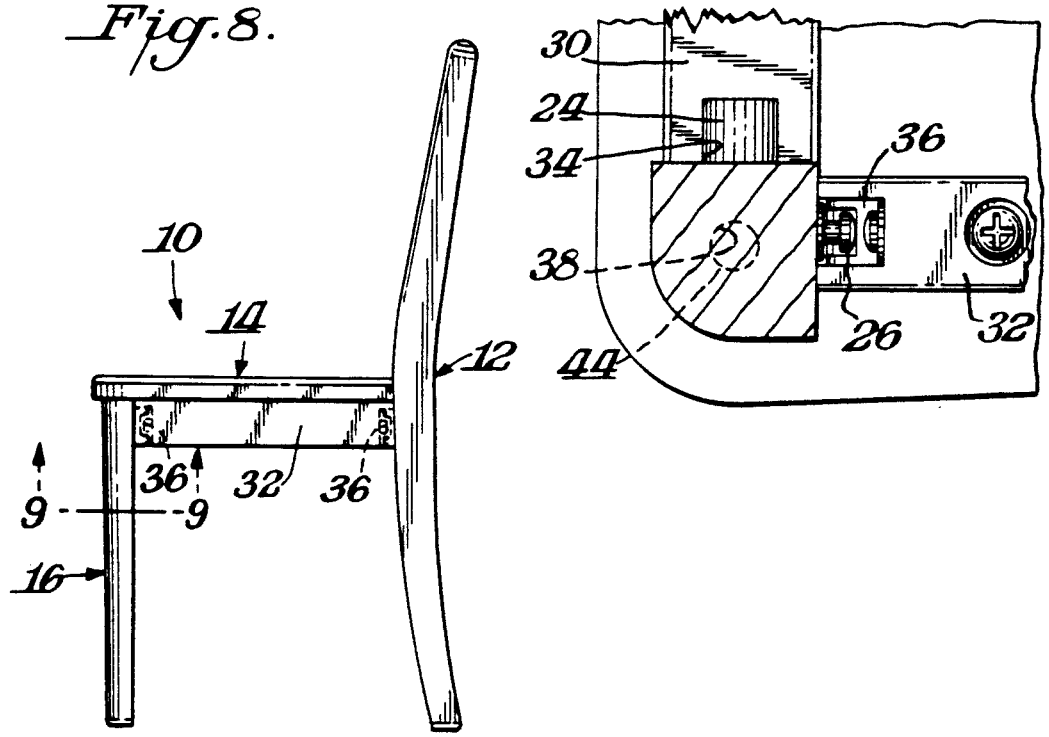

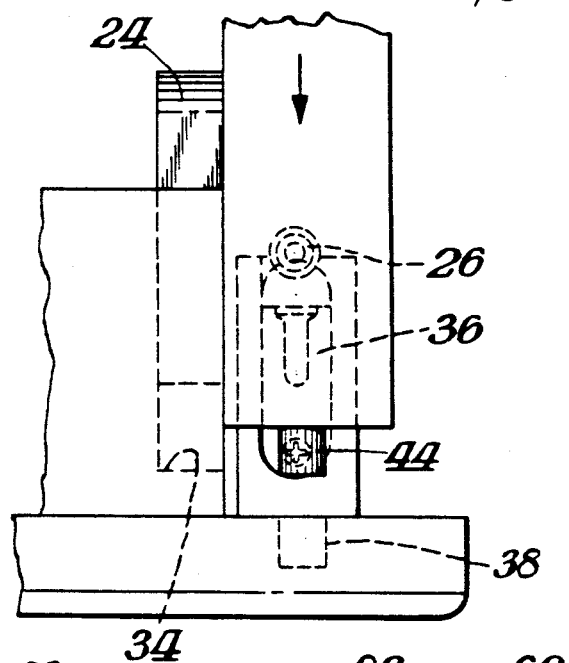
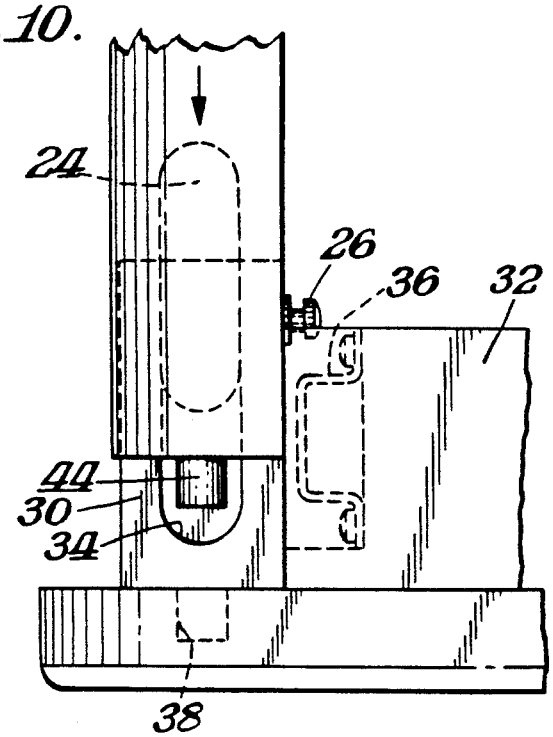
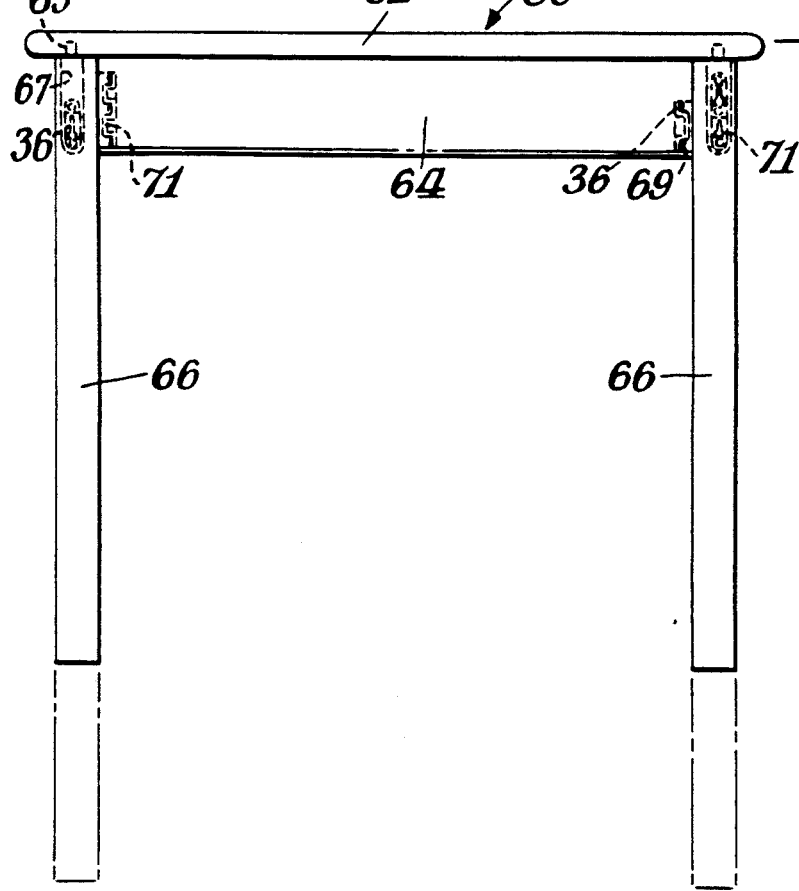
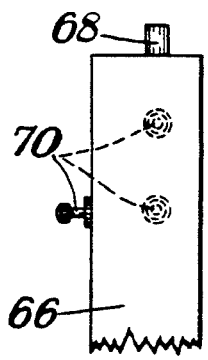

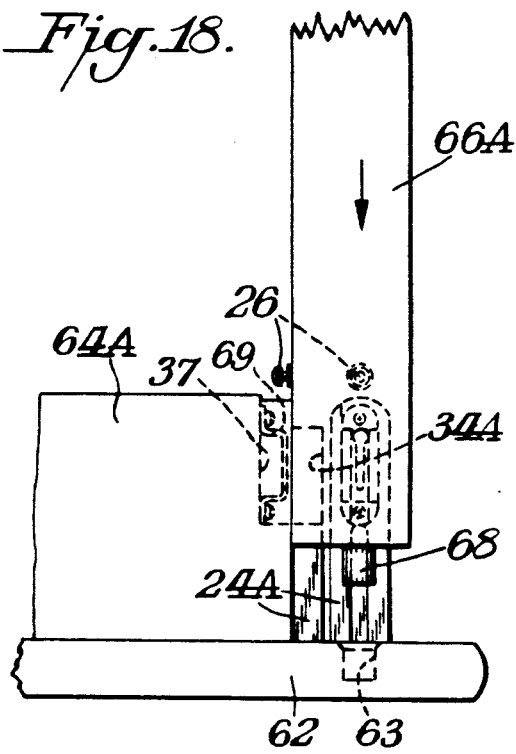
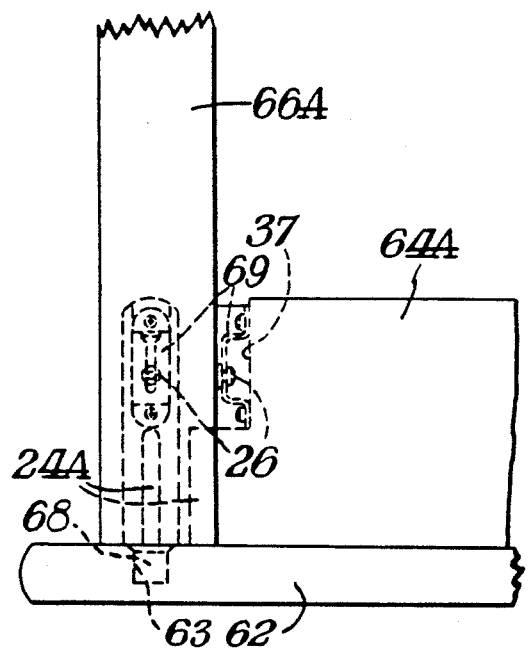
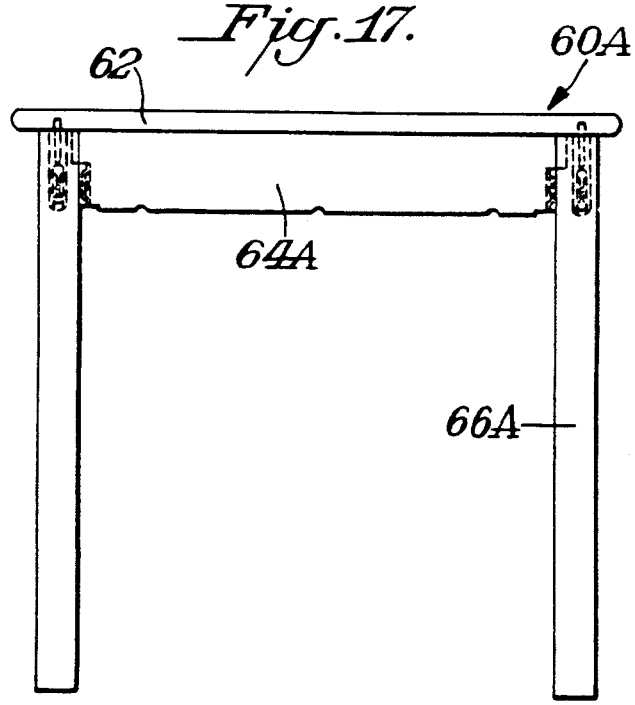
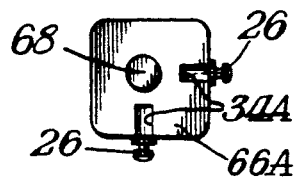
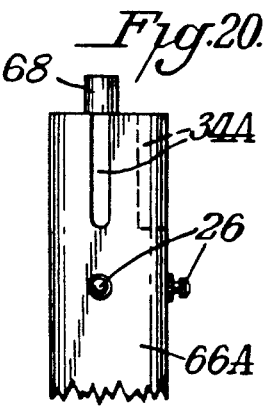

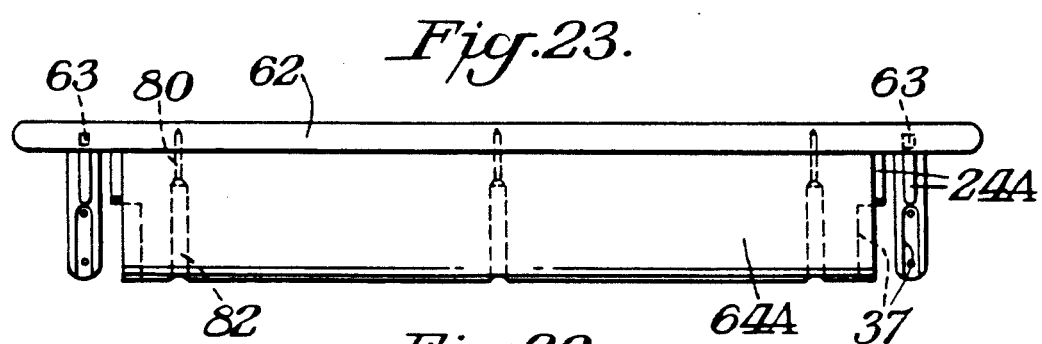
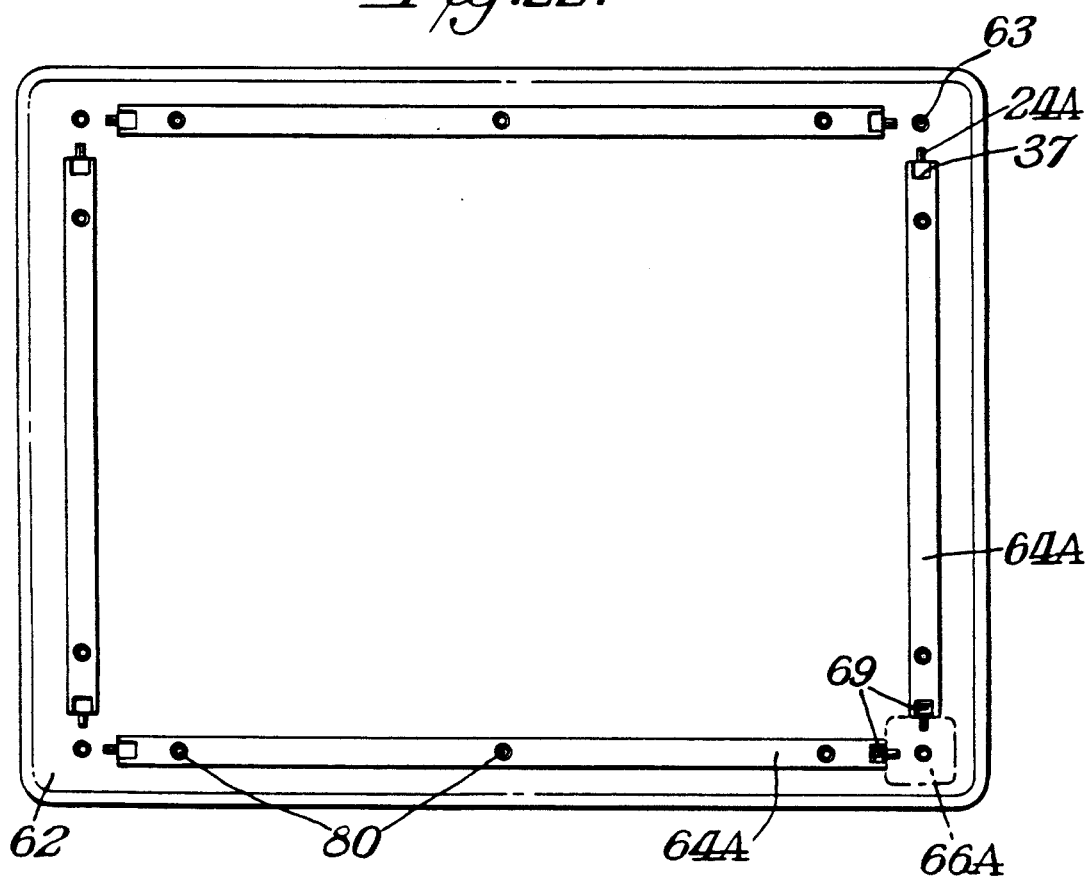

READY-TO-ASSEMBLE FURNITURE WITH IMPROVED FASTENING MEANS

BACKGROUND OF THE INVENTION

This invention is a continuation-in-part and a divisional of co-pending application Ser. No. 531,878, now issued as U.S. Pat. No. 5,088,180 issued Feb. 18, 1992.

This invention relates to ready-to-assemble furniture capable of being assembled by the consumer without the need for tools, screws, nails or glue. The elements can be packaged and shipped disassembled. When assembled, the elements are rigidly, but removably, attached and have connection joints of enhanced structural strength and stability.

Furniture capable of assembly by the consumer, e.g., ready-to-assemble, is well known; however, such furniture assembly typically involves lengthy detailed assembly steps, which include the use of glue or other adhesives or the use of hand tools, screws, brackets or nails to fasten the elements together. The disassembly and reassembly of this furniture is often not practicable.

Certain ready-to-assemble furniture without such adhesives or the need for tools is also known. Such furniture, often called knock-down furniture, employs various surface-mounted or recess-mounted fastener clips and mating shoulder screws, such as the furniture described in U.S. Pat. Nos. 3,996,718, 4,178,047, 4,332,205, 4,470,716, 4,473,316, 4,474,493, assigned to Modular Systems, Inc. of Fruitport, Mich. The use of such clips as the only fastening means results in joints of less-than-desirable structural stability and also requires lengthy mating surfaces of the furniture parts being joined in order to give stability and strength to the overall furniture assembly.

Therefore, it is an object of this invention to provide ready-to-assemble furniture without these disadvantages.

SUMMARY OF THE INVENTION

Accordingly, the present invention provides a multi-part article of furniture capable of assembly without tools, screws, nails or glue. The supporting members, such as the legs of a table or chair, are rigidly, but removably, attached to the member being supported, such as a table top or chair seat, by slideably engaging an elongated dowel protruding from a side surface of the upper end of the supporting member into a mating slot formed in the end wall of an apron attached to the underside of the supported member. Alternatively, the elongated dowel may protrude from the apron and engage a mating slot in the side of the leg. This connection between elongated dowel and mating slot provides improved structural strength over other fastening means.

In a preferred embodiment of the invention, the legs of a table or chair are provided with a standard wooden dowel axially aligned with the leg and extending from the upper end of the leg, an elongated dowel protruding from an upper side surface of the leg and a fastener such as a shoulder screw protruding from another upper side surface of the leg, substantially perpendicular to the elongated dowel. Optionally, the upper side surfaces of the legs may be provided with an elongated dowel, or a mating slot to engage an elongated dowel, and a fastener. The underside of the table or chair seat is provided with aprons, which have been previously affixed lengthwise with the ends of the aprons spaced a predetermined distance from each other corresponding to the width of the legs at the upper end. On the ends of the aprons are provided either mating slots or recesses into which recesses semi-locking fastener clips have been inserted. Optionally, the ends of the aprons may be provided with an elongated dowel, or a mating slot to engage an elongated dowel, and a recess into which a semi-locking fastener clip is inserted.

To assemble the table or chair, the elongated dowel and fastener protruding from the upper side surfaces of the legs are slideably engaged into the mating slot and fastener clip of the aprons, respectively. When the leg is fully engaged, the upper dowel protruding from the upper end of the leg is inserted into a bore in the underside of the table or chair seat and the upper end surface of the leg is in contact with the underside of the table or chair seat. The legs are thus connected to the table or chair seat at at least three points. Such connection is stable and structurally sound; yet, the legs can be easily disassembled for storage or replacement.

In an alternative embodiment the elongated dowel and corresponding mating slot can be replaced by a double fastener clip and fastening means.

In another preferred embodiment the height of the furniture can be adjusted by replacing the entire set of legs with longer legs or by attaching leg extension members to the bottom of the legs. Such attachment requires no tools, screws, nails, brackets or glue.

The simplicity of assembly and disassembly is an advantage not found with other ready-to-assemble furniture fastened together with tools or glue. The furniture may be repeatedly disassembled and reassembled without any loss of structural integrity. The strength and stability of the connections between the legs and table or chair seat is improved over other knock-down furniture.

These and other objects, advantages, purposes and features of the invention will become more apparent from a study of the following description in conjunction with the drawings.

BRIEF DESCRIPTION OF THE DRAWINGS

FIG. 1 is a front elevational view of a chair back and back-leg member.

FIG. 2 is a side elevational view of a chair back and back-leg member.

FIG. 6 is a front elevational view of the front-leg assembly.

FIG. 7 is a side elevational view of the front-leg assembly.

FIG. 8 is a side elevational view of the entire chair assembly.

FIG. 9 is a fragmentary sectional view taken along the line 9—9 of FIG. 8 to show the connections between the chair seat aprons and one front leg.

FIG. 10 is a partial side-elevational view of the assembly of a supporting leg to the chair seat or table top.

FIG. 11 is a partial front-elevational view of the assembly of a supporting leg to the chair seat or table top.

FIG. 12 is a front elevational view of the table assembly, illustrating alternative connection between supporting legs and table top.

FIG. 13 is a partial front elevational view of a table leg, with fasteners for alternative connection.

FIG. 17 is a front elevational view of the table assembly, illustrating a further alternative connection between the supporting legs and table top.

FIG. 18 is a partial front-elevational view of the assembly of a supporting leg to the chair seat or table top, illustrating the further alternative connection between the supporting legs, apron and chair seat or table top.

FIG. 19 is a partial side-elevational view of the assembled supporting leg, apron and chair seat or table top, illustrating the further alternative connection between the supporting legs, apron and chair seat or table top.

FIG. 20 is a partial side-elevational view of a table leg, with dowel and fasteners and elongated mating slots for further alternative connection.

FIG. 21 is a top plan view of a table leg, with dowel and fasteners and elongated mating slots for further alternative connection.

FIG. 22 is a bottom plan view of a table top with aprons attached showing one table leg in phantom and illustrating the further alternative connection between the supporting leg, apron and table top.

FIG. 23 is a side elevational view of the table top with attached aprons.

DETAILED DESCRIPTION OF THE PREFERRED EMBODIMENTS

Figure 5:
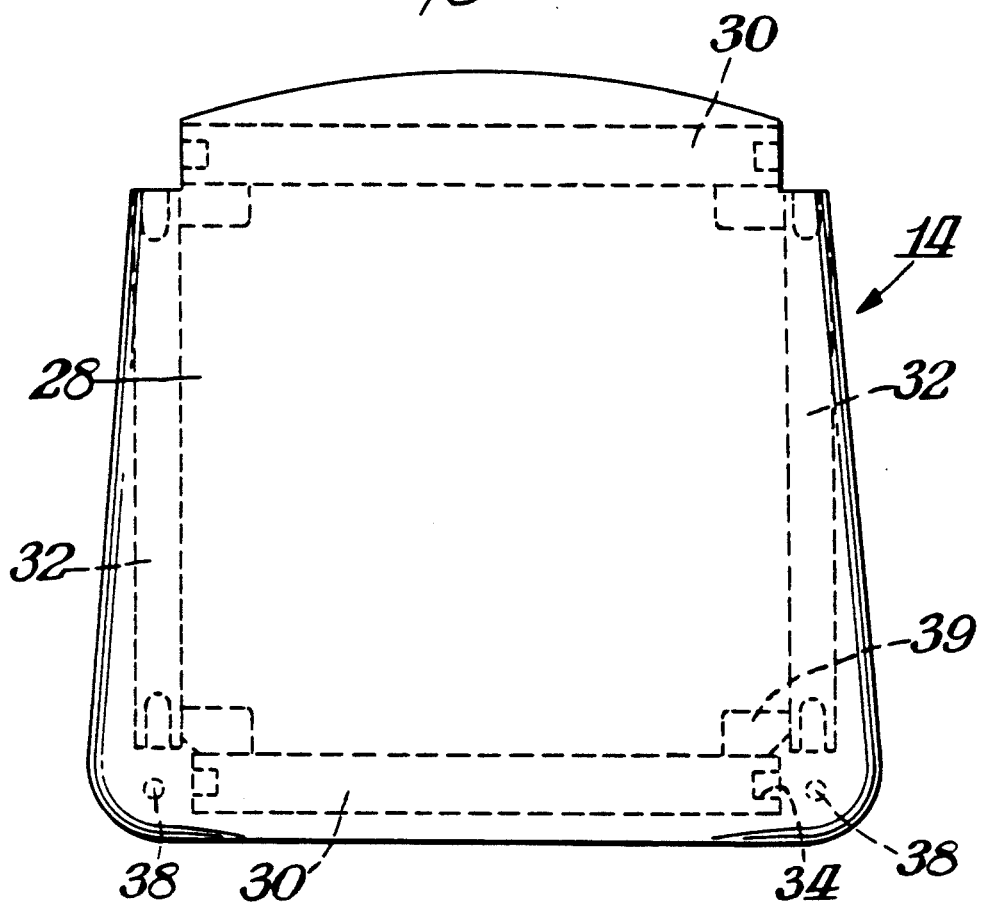
FIG. 5 is a top plan view of the chair seat.

Referring now to the drawings in greater detail, FIGS. 1 through 10 illustrate a first embodiment of the ready-to-assemble furniture of the present invention. This first embodiment is a chair assembly 10 (FIG. 8). The chair is composed of a chair back and back-leg member 12, a chair seat and apron member 14, and a front leg member 16, slideably engageable with one another to form a chair. The chair assembly 10 is illustrated in FIG. 8.

As shown in FIGS. 1 and 2, the chair back and leg member 12 is composed of two rails 18, which are connected by a rung 22 and one or more slats 20. Projecting from the rails 18 in a direction substantially parallel to the slats 20 and rung 22 are two elongated dowels 24. The elongated dowels 24 are preferably located substantially at the midpoint of the rails 18. Also projecting from the rails 18 are two fasteners 26, such as shoulder screws, studs or other projecting fasteners of the type described in U.S. Pat. Nos. 3,741,594, 3,894,377, 3,996,718, 4,332,205, 4,470,716, and 4,473,316. The shoulder screws 26 project from the front surface of the rails 18, substantially perpendicular to the elongated dowels 24. The shoulder screws 26 are located substantially at the same height on the rails 18 as the elongated dowels 24.

Figure 3:
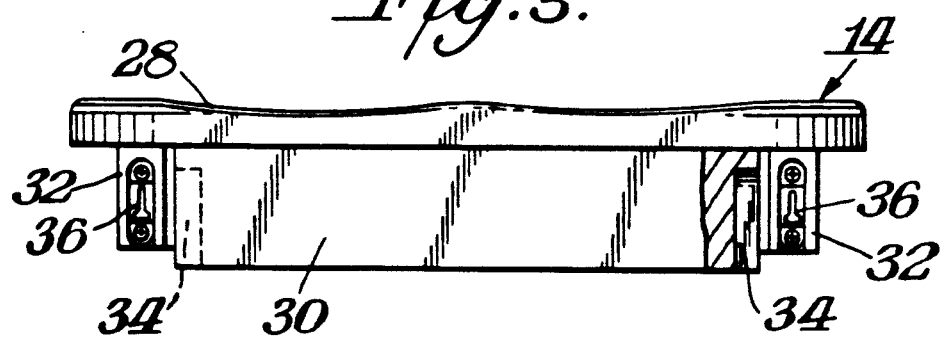
FIG. 3 is a front elevational view of the chair seat with an affixed front apron, which is partially cut away at one end to show detail of mating slot.
Figure 4:
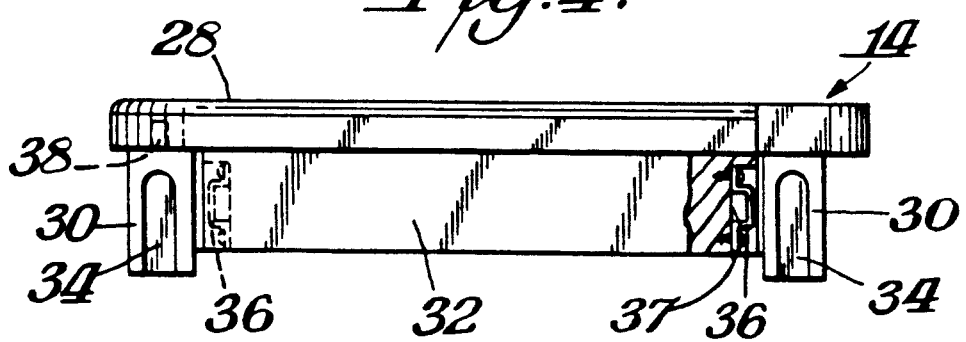
FIG. 4 is a side elevational view of the chair seat with an affixed side apron, which is partially cut away at one end to show detail of fastener clip.

FIGS. 3 through 5 show the elements of the chair seat and apron member 14 of the chair assembly 10. FIG. 5 is a top plan view of the chair seat 28. Attached to the underside of the chair seat 28 are two sets of aprons 30, 32. FIG. 3 is a front elevation of the chair seat 28 with the apron 30 attached (in the factory) to the underside of the chair seat 28 by any suitable fastening means, such as screws or brackets, generally known to the art. (For example, FIGS. 22 and 23 show aprons 64A attached to the underside of a table top 62 by screws 80 inserted into one or more countersink bores 82 through the aprons 64A.) The apron 30 has a mating slot 34 cut into each end wall of the apron 30. Preferably, there are two such aprons 30 of the type shown in FIG. 3 attached to the underside of the chair seat 28; with one such apron 30 attached at substantially the front underside edge of the chair seat, and the other such apron 30 attached to the rear underside edge of the chair seat.

FIG. 4 shows a side elevation of the chair seat 28 with apron 32, partially cut away to show in greater detail the fastener in the end walls of the apron 32. In FIG. 4 a factory-installed apron 32 is attached to the underside of the chair seat 28 by any suitable fastening means, such as with screws or brackets. The apron 32 has fasteners 36 secured in a recess 37 in each end wall of the apron 32. The fasteners 36 are preferably semi-locking fastener clips such as those disclosed in U.S. Pat. Nos. 4,473,316, 3,996,718 and 3,894,377. Preferably there are two such aprons 32 of the type shown in FIG. 4 attached to the underside of the chair seat 28, with one such apron 32 at one underside edge of the chair seat and the other such apron 32 at another underside edge of the chair seat.

The aprons 30, 32 protrude from the underside of the chair seat in a substantially perpendicular direction and are additionally substantially perpendicular to one another. Spacer blocks 39 may be attached to the underside of the chair seat 28 in order to square the alignment of the aprons 30, 32. Such spacer blocks 39 are generally known to be suitable for this purpose. When the aprons 30, 32 are so aligned as shown in hidden detail in FIG. 5, the spaces formed between the end walls of the aprons 30, 32 are a predetermined width dimension for the upper end of the front legs 40 and for the substantial midpoint of the rails 18. The underside of the chair seat also may contain two or more bores 38, located near the front corners of the chair seat 28.

FIGS. 6 and 7 illustrate the front leg assembly 16 of the chair assembly 10. In the factory the two front legs 40 are connected by a rung 42. At the upper end of the legs 40 there are dowels 44 protruding from the upper leg surface in the axial direction of the legs 40. Protruding from the upper side surface of the legs 40, substantially perpendicular thereto and in a direction parallel to the rung 42 are two elongated dowels 24. These elongated dowels 24 are similar to the elongated dowels 24 of the chair back and leg assembly 12 shown in FIG. 1. Fasteners 26 such as shoulder screws, protrude from an upper side surface of the leg 40 in a direction perpendicular to the elongated dowel 24.

The chair 10 may be assembled by the purchaser in only two simple steps. First, as shown in detail in FIGS. 10 and 11, the front leg assembly 16 is rigidly but removably attached to the chair seat assembly by slideably engaging the shoulder screws 26 of the front legs 40 into the fastener clips 36 of the two aprons 32. At the same time, the elongated dowels 24 of the front leg assembly 16 are slideably engaged into the mating slots 34 of the apron 30 affixed to the front underside of the chair seat 14. The screws 26 and elongated dowels 24 of the front legs 40 are thus inserted into the fastener clips 36 and mating slots 34, respectively, and the legs 40 are forced toward the chair seat 28 until the dowel 44 nests in the bore 38 in the underside of the chair seat 28.

Second, in a similar manner the chair back and backleg assembly 12 is rigidly but removably attached to the chair seat assembly 14. The shoulder screws 26 protruding from the chair rails 18 may be slideably engaged into the fastener clips 36 of the aprons 32. At the same time, the elongated dowels 24 protruding from the chair rails 18 may be slideably engaged into the mating slots 34 of the apron 30 affixed to the rear underside of the chair seat 28. The elongated dowels 24 and shoulder screws 26 thus inserted are forced toward the chair seat 28 until fully engaged in the mating slots 34 and fastener clips 36.

FIG. 9 discloses in detail the connection between the front leg assembly 16 and the aprons 30, 32 of the chair seat assembly 14. In the assembled form the shoulder screw 26 is engaged firmly in the fastener clip 36. The dowel 44 is engaged firmly in the bore 38. The elongated dowel 24 is engaged in the mating slot 34. There are thus three connections between the front leg assembly 16 and the chair seat assembly 14. As so connected, the legs 40 are rigidly but removably attached to the chair seat and apron assembly 14. As attached, the chair is more structurally stable than other knock-down furniture presently known.

As should be readily apparent to those skilled in the art, the connecting members may be incorporated into the chair seat and apron assembly 14 and front and back leg assemblies 16, 12 in an alternate fashion such that the elongated dowels 24 and fastening means 26 may protrude from the aprons 30, 32 and the rails or legs 18, 40 may contain mating slots 34 and recesses 37 into which fastening clips 36 have been installed. Moreover, in a further alternative embodiment elongated dowels 24 may protrude from each end wall of the aprons 30, 32 and also recesses 37 for fastening clips 36 may be contained in each end wall of the aprons 30, 32. With such a further alternative embodiment, fastening means 26 may protrude from more than one upper side wall of the rails or legs 18, 40 and such upper side walls may additionally contain elongated mating slots 34.

Neither tools, nor glue, nor adhesive are required for the purchaser to affix the three elements 12, 14, 16 of the chair assembly 10 to each other. No additional parts, such as screws or brackets or other fastening means, are required.

The ready-to-assemble chair invention disclosed herein can be disassembled in a simple manner as well without the need for any tools. Disassembly entails removing the front leg assembly 16 from the chair seat and apron assembly 14 by applying a force in the opposite direction of the assembly process. One may disengage the shoulder screws 26 from the fastener clips 36 and at the same time disengage the elongated dowels 24 from the mating slots 34 and the dowels 44 from the bores 38. In a similar manner the chair back and rear-leg assembly 12 may be disengaged from the chair seat and apron assembly 14. The shoulder screws 26 may be disengaged from the fastening clips 36 of the apron 32, and at the same time the elongated dowels 24 may be disengaged from the mating slots 34. Once disengaged, the separate assemblies are readily stored or moved, a most desirable feature. Such disassembly and reassembly can be done repeatedly without any loss of structural integrity.

This invention is also particularly suited to other ready-to-assemble furniture such as tables, stools or shelving. The connection between any supporting leg and a surface to be supported, such as a table top, can be identical to the connection between the front leg 40 and chair seat and apron assembly 14 of the chair, detailed in FIGS. 1 through 11.

In another embodiment of the invention the elongated dowels 24 and mating slots 34 can be replaced by other fastening means. For example, there is shown in FIGS. 12 and 13 a table assembly 60 comprising a table top with four aprons 64 affixed to the underside of the table top 62. The aprons 64 have in a recess at one end a single semi-locking fastener clip 69 and in a recess and at the other end a semi-locking double fastener clip 71. Such semi-locking double fastening clips 71 are available from Modular Systems, Inc. of Fruitport, Mich. 49415. In the factory, the aprons 64 are attached lengthwise and substantially perpendicular to the underside of the table top 62, preferably along the outer edges of the table top 62, using any suitable fastener generally known, such as screws or brackets. The ends of the aprons 64 so attached are spaced from one another a predetermined distance corresponding to the width dimension of the upper end of the leg 66. The aprons 64 are attached so that the end of an apron 64 with a single fastening clip 69 is proximate to an end of another apron with a double fastening clip 71. Four legs 66 are provided, having a dowel 68 protruding in an axial direction from the upper end surface and having a single fastener means, such as a shoulder screw 70, protruding substantially perpendicularly from an upper side surface of the legs 66. A pair of fastening means, such as shoulder screws 70, also protrude substantially perpendicularly from an upper side surface of the leg 66 and in a direction perpendicular also to the single shoulder screw 70, earlier mentioned.

The table 60 is assembled with only a few simple steps. The legs 66 are rigidly but removably inserted into the table top and apron assembly 62, 64. First, the single protruding shoulder screw 70 is slideably engaged into the single fastening clip 69 in the end wall of one apron 64. At the same time, the pair of shoulder screws 70 protruding from the table legs 66 are slideably engaged into the double fastener clip 71 of another proximate apron 64. By pushing the upper end surface of the leg 66 toward the underside of the table top 62, the three shoulder screws 70 will fully engage into the openings in the fastener clips 69, 71, and the dowel 68 protruding from the upper surface of the leg 66 in the axial direction will engage the bore 63 in the underside of the table top 62. There are thus at least three connections between the leg 66 and the table top and apron assembly 62, 64. Yet, assembly by the purchaser requires neither tools nor glue, nor additional fasteners, such as screws or brackets.

To disassemble the table 60, the legs 66 must be removed in the opposite manner from which they were inserted, thereby pulling the dowel 68 out of the bore 63 in the table top 62 and disengaging the shoulder screws 70 from the fastener clips 69, 71. As assembled, the table is most rigid and sturdy, but disassembly can be most readily accomplished. Reassembly is conducted in the same manner as assembly. Reassembly and disassembly can be done repeatedly.

It is often desired that furniture for children or juveniles be readily adaptable to use by adults; that is, when the children grow, it would be desirable to have furniture that will grow with them. This invention will accomplish such objective. For example, with the table disclosed in FIGS. 12 and 13, the legs 66 can be sold in varying lengths. Thus, when a longer-length table leg is desired, the shorter legs are simply removed as described above and the longer legs can be inserted into the table top and apron assembly 62, 64.

Figure 14:
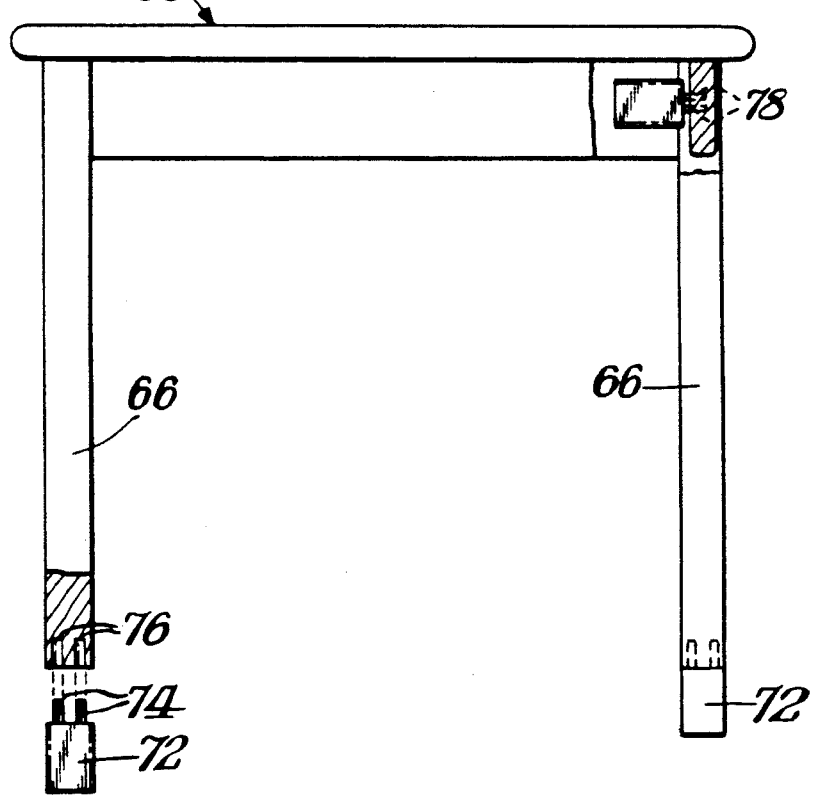
FIG. 14 is a front elevational view of a table assembly, partially cut away to show detail for alternate leg-extending embodiment.
Figure 16:
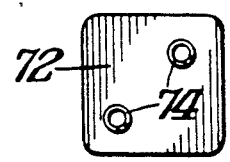
FIG. 16 is a top plan view of a leg-extension member.
Figure 15:
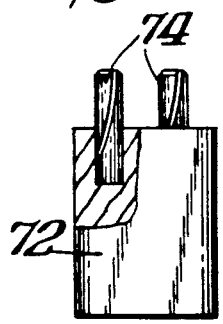
FIG. 15 is a side elevational view of a leg-extension member, partially cut away to show detail of compression dowel.

In another embodiment of the invention, as shown in FIGS. 14 through 16, the legs 66 can be extended by the addition of leg extension members 72 attached to the bottom of the legs. Thus, the bottom ends of the table legs 66 are provided with one or more axial directed bores 76. One or more compression dowels 74 extending perpendicularly from the upper surface of leg extension members 72 are inserted into the bores 76 of the table leg 66. The compression dowels 74 are force-fit into the bores 76, providing rigid but removable attachment without the need for tools or glue. Suitable compression dowels for this purpose are disclosed in U.S. Pat. No. 4,474,493, although other known, equally suitable fasteners may be employed. The length of the table leg 66 can be extended, using one or more of these extension members 72.

It may be desired to sell the table leg extension members 72 in conjunction with the original table assembly 60 in the same package. If so, such table leg extension members 72 can be stored until needed by inserted the compression dowels 74 of the leg extension members into bores 78 drilled into the inner side surface of the aprons 64 of the table assembly 60. Such method of storage is shown in FIG. 14 in partial cut-away view. Other storage methods can be employed. For example, the leg extension members 72 can be separately packaged and the package enclosed with or attached to the table assembly 60.

FIGS. 17 to 23 show yet a further alternative embodiment of the multipart article of furniture of the present invention. A table assembly 60A in FIG. 17 again is comprised of four aprons 64A attached (in the factory) lengthwise and substantially perpendicular to the underside of a table top 62. The table assembly 60A also includes four removable legs 66A. The aprons 64A may be attached by any suitable means known to the art. FIGS. 22 and 23 show the aprons 64A attached to the underside of the table top 62 by screws SO inserted into countersink bores 82 through the width of the aprons 64A. Preferably as shown in FIG. 22, the aprons 64A are attached along the outer edges of the table top 62 so that the end walls of the aprons 64A so attached are spaced from one another a predetermined distance corresponding to the width dimension of the upper end of each of the legs 66A.

As shown in FIG. 23, an elongated dowel 24A protrudes substantially perpendicularly from each apron end wall. Additionally, the end wall of each apron contains a recess 37 into which a fastening clip 69 is attached.

Four legs 66A are provided, having a dowel protruding in an axial direction from the upper end surface. The legs 66A also have a single fastener means, such as a shoulder screw 26, protruding substantially perpendicularly from two adjacent upper side surfaces of each leg 66A. These two adjacent upper side leg surfaces also each define elongated U-shaped mating slots 34A, aligned lengthwise with the protruding fastener means 26. This construction of the legs is best shown in FIGS. 21 and 22.

The table 60A is assembled with only a few simple steps as shown in FIGS. 18 and 19. The legs 66A are rigidly but removably inserted into the table top and apron assembly 62, 64A. First the elongated U-shaped slots 34A in the table leg 66A are aligned with and mated with the elongated dowels 24A protruding from the end walls of two proximate aprons 64A. Then, as the upper end of the leg 66A is moved axially toward the underside of the table top 62, the elongated dowels 24A slideably engage with the U-shaped elongated slots 34A and, as the upper wall of the leg 66A nears the underside of the table top 62, the fasteners 26 slideably engage the fastening clips 69. Finally, the axially projecting dowel 68 will fully engage the bore 63 in the underside of the table top 62 when the leg 66A is fully installed. This procedure is repeated for each leg 66A.

There are thus several connections between the leg 66A and the table top and apron assembly 62, 64A. The upper end surface of each leg 66A is connected to the underside of the table top 62 by the dowel 68 engaged in the bore 63. Two of the four upper side surfaces of each leg 66A are attached to the end walls of two aprons 64A by both an elongated dowel 24 slideably engaged with a U-shaped slot 34A and a fastener 26 slideably engaged with a fastener clip 69. The assembled table top is most rigid and sturdy. Yet, assembly by the purchaser requires neither tools, nor glue, nor additional fasteners, such as screws or brackets.

The table assembly 60A may be disassembled by removing the table legs 66A in the opposite manner from which they were inserted, thereby disengaging the dowel 68 out of the bore 63 in the table top 62 and disengaging the shoulder screws 26 from the fastener clips 36 or 69 and the elongated slots 34A from the elongated dowels 24A. Reassembly is conducted in the same manner as assembly. Reassembly and disassembly can be done repeatedly. The connections between the table top and aprons 62, 64 and legs 66A in this alternative embodiment as shown in the table assembly 60A in FIGS. 17–23 may also be used with other types of furniture.

While several forms of the invention have been shown and described, other forms will now be apparent to those skilled in the art. Therefore, it will be understood that the embodiments shown in the drawings and described above are merely for illustrative purposes, and are not intended to limit the scope of the invention, which is defined by the claims which follow.

We claim:
1. A multi-part article of furniture, comprising:
   a) an essentially planar member having an upper surface and a lower surface;
   b) multiple aprons, each apron having end walls, the aprons being attached lengthwise to the lower surface of the planar member and with the end walls of the aprons spaced a predetermined distance from each other in at least three locations;
   c) multiple support members for supporting said planar member above a solid surface, the support members having at least one dimension substantially equal to the distance between the end walls of the multiple aprons;
   d) an elongated dowel slideably engageable with an elongated U-shaped mating slot for rigidly but removably affixing the support members to the aprons.
2. A multi-part article of furniture as recited in claim 1, further comprising fastener clips and slideably engageable mating fasteners for rigidly but removably affixing the support members to the aprons.

3. A multi-part article of furniture as recited in claim 1 further comprising a dowel slideably engageable into a bore for rigidly but removably affixing the support members to the planar member.

4. A multi-part article of furniture as recited in claim 1 wherein the article is a chair.

5. A multi-part article of furniture as recited in claim 1 wherein the article is a table.

6. A multi-part article of furniture as recited in claim 2 wherein the aprons and support members are fastened together by a plurality of elongated dowels, a plurality of U-shaped mating slots, a plurality of fastener clips and a plurality of mating fasteners.

7. A multi-part article of furniture, comprising:
  (a) an essentially planar member having an upper surface and a lower surface;
  (b) multiple aprons, each apron having end walls, the aprons being attached lengthwise to the lower surface of the planar member with the end walls of the aprons spaced a predetermined distance from each other in at least three locations;
  (c) multiple support members for supporting said planar member above a solid surface, the support members having at least one dimension substantially equal to the distance between the end walls of the multiple aprons; and
  (d) fastener clips and slideably engageable mating fasteners for rigidly but removably affixing the support members to the aprons.

8. A multi-part article of furniture as recited in claim 7 further comprising an elongated dowel slideably engageable into an elongated U-shaped bore for rigidly but removably affixing the support members to the aprons.

9. A multi-part article of furniture as recited in claim 7 wherein the article is a chair.

10. A multi-part article of furniture as recited in claim 7 wherein the article is a table.

* * * * *